US009132550B2

(12) United States Patent  (10) Patent No.: US 9,132,550 B2
Jung et al.  (45) Date of Patent: Sep. 15, 2015

(54) APPARATUS AND METHOD FOR MANAGING ROBOT COMPONENTS

(71) Applicant: Electronics and Telecommunications Research Institute, Daejeon (KR)

(72) Inventors: Seungwoog Jung, Daejeon (KR); Choulsoo Jang, Daejeon (KR); Byoung Youl Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 222 days.

(21) Appl. No.: 13/629,860

(22) Filed: Sep. 28, 2012

(65) Prior Publication Data

US 2013/0090760 A1  Apr. 11, 2013

(30) Foreign Application Priority Data

Oct. 7, 2011  (KR) .................. 10-2011-0102570

(51) Int. Cl.
   B25J 9/16  (2006.01)
(52) U.S. Cl.
   CPC ..... B25J 9/1674 (2013.01); *G05B 2219/40164* (2013.01)
(58) Field of Classification Search
   CPC .................. B25J 9/1674; G05B 2219/40164; G06F 8/20; G06F 8/35; G06F 9/541; G06F 11/0709; G06F 11/0793; G06F 11/079; H04L 41/16
   See application file for complete search history.

(56) References Cited

U.S. PATENT DOCUMENTS

| | | | | |
|---|---|---|---|---|
| 5,940,839 A | * | 8/1999 | Chen et al. | 1/1 |
| 6,708,291 B1 | * | 3/2004 | Kidder | 714/39 |
| 6,715,097 B1 | * | 3/2004 | Kidder et al. | 714/2 |
| 6,983,362 B1 | * | 1/2006 | Kidder et al. | 713/1 |
| 7,493,528 B1 | * | 2/2009 | Reichert et al. | 714/48 |
| 7,536,370 B2 | * | 5/2009 | Masurkar | 706/47 |
| 7,536,595 B1 | * | 5/2009 | Hiltunen et al. | 714/26 |
| 7,580,994 B1 | * | 8/2009 | Fiszman et al. | 709/223 |
| 7,779,298 B2 | * | 8/2010 | Challenger et al. | 714/15 |
| 8,078,357 B1 | * | 12/2011 | Trytten et al. | 701/36 |
| 8,219,848 B2 | * | 7/2012 | Branson et al. | 714/3 |
| 8,225,129 B2 | * | 7/2012 | Douglis et al. | 714/2 |
| 8,359,495 B2 | * | 1/2013 | Candea et al. | 714/26 |
| 8,527,622 B2 | * | 9/2013 | Moreira Sa de Souza | 709/224 |
| 2006/0153068 A1 | * | 7/2006 | Dally et al. | 370/219 |
| 2010/0152894 A1 | | 6/2010 | Ha | |

(Continued)

FOREIGN PATENT DOCUMENTS

| | | |
|---|---|---|
| KR | 1020100068588 | 6/2010 |
| KR | 1020100135063 | 12/2010 |
| KR | 1020110064971 | 6/2011 |

*Primary Examiner* — Khoi Tran
*Assistant Examiner* — Bao Long T Nguyen
(74) *Attorney, Agent, or Firm* — Nelson Mullins Riley & Scarborough LLP

(57) ABSTRACT

An apparatus manages robot components in a robot. The apparatus includes a component monitoring unit to monitor a state of the robot components and a breakdown decision unit to judge whether or not any robot components are broken down based on the monitoring results and generate breakdown information corresponding to the breakdown decision results. The apparatus further includes a recovery policy management unit to choose a recovery policy model necessary to recover the breakdown using the breakdown information and a breakdown recovery unit configured to recover the broken robot component based on the chosen recovery policy model.

8 Claims, 4 Drawing Sheets

(56) References Cited

U.S. PATENT DOCUMENTS

| | | | |
|---|---|---|---|
| 2011/0029810 A1* | 2/2011 | Jaisinghani | 714/7 |
| 2011/0071676 A1* | 3/2011 | Sanders et al. | 700/250 |
| 2011/0138224 A1 | 6/2011 | Lee et al. | |
| 2012/0254652 A1* | 10/2012 | Katiyar et al. | 714/4.1 |

* cited by examiner

FIG.4

RECOVERY POLICY MODEL

- BREAKDOWN TYPE
- BREAKDOWN CAUSE
- BREAKDOWN RECOVERY ACTION

APPARATUS AND METHOD FOR MANAGING ROBOT COMPONENTS

RELATED APPLICATION(S)

This application claims the benefit of Korean Patent Application No. 10-2011-0102570, filed on Oct. 7, 2011, which is hereby incorporated by reference as if fully set forth herein.

FIELD OF THE INVENTION

The present invention relates to a robot component management technique, and more particularly, to an apparatus and method for managing robot component, which are suitable for sensing and recovering a fault of the robot components.

BACKGROUND OF THE INVENTION

Recently, service robots that interact with people to provide various services in general households have been developed.

Such robots provide services in spaces in which people lead a daily life, so if a robot application driven within a robot is broken down, the robot may malfunction to cause inconvenience to a user.

Thus, the development of a technique capable of sensing a breakdown of a robot and taking a necessary action to prevent malfunction of the robot is required.

SUMMARY OF THE INVENTION

In view of the above, therefore, the present invention provides an apparatus and method for managing a robot component capable of preventing malfunction of a robot and continuously providing a service.

In accordance with an aspect of the present invention, there is provided an apparatus for managing robot components in a robot, the apparatus including: a component monitoring unit configured to monitor a state of the robot components; a breakdown decision unit configured to judge whether or not any robot components are broken down based on the monitoring results, and generate breakdown information corresponding to the breakdown decision results; a recovery policy management unit configured to choose a recovery policy model necessary to recover the breakdown using the breakdown information; and a breakdown recovery unit configured to recover the broken robot component based on the chosen recovery policy model.

In the apparatus, the breakdown information includes at least one of a type of the breakdown, importance of the breakdown, and an identifier of a component which has caused the breakdown.

In the apparatus, the recovery policy management unit includes multiple recovery policy nodes configured to have a tree structure, each recovery policy node having one or more recovery models corresponding to the breakdown information.

In the apparatus, the recovery policy nodes include a parent recovery policy node and multiple child recovery policy nodes.

In the apparatus, the recovery policy nodes include: an uppermost recovery policy node that does not have the single parent recovery policy node; and terminal recovery policy nodes that do not have the multiple child recovery policy nodes.

In accordance with another aspect of the present invention, there is provided a method for managing robot components in a robot, the method including: monitoring a state of the robot components; analyzing the monitoring results of the robot components to judge whether or not the robot components are broken down; generating breakdown information when it is determined that any robot components are broken down; selecting a recovery policy model corresponding to the breakdown information; and recovering the broken robot component based on the recovery policy model.

In the method, the generating a recovery policy model includes: selecting a recovery policy node corresponding to a type of the breakdown; and choosing the recovery policy model contained the selected breakdown recovery policy node using the breakdown information.

In the method, the generating a recovery policy model includes: returning the selected recovery policy model; and delivering the returned recovery policy model to recover the breakdown.

In the method, the generating a recovery policy model includes: determining whether or not a parent recovery policy node exists among recovery policy nodes when the recovery policy model is not selected; and choosing the parent recovery policy node as the recovery policy node when the parent recovery policy node exists.

Preferably, the method further includes: returning to monitor a state of the robot components when the parent recovery policy node does not exist.

In the method, the breakdown information includes at least one of a type of the breakdown, importance of the breakdown, and an identifier of a component which has caused the breakdown.

In the method, the recovery policy model includes a type of the breakdown, a cause of the breakdown, and an action to be taken to recover the breakdown.

BRIEF DESCRIPTION OF THE DRAWINGS

The above and other objects and features of the present invention will become apparent from the following description of preferred embodiments, given in conjunction with the accompanying drawings, in which:

FIG. 4 is an exemplary view of a recovery policy model applied to the embodiment of the present invention.

DETAILED DESCRIPTION OF THE EMBODIMENTS

The advantages and features of embodiments and methods of accomplishing these will be clearly understood from the following embodiments taken in conjunction with the accompanying drawings. However, embodiments are not limited and may be implemented in various forms. It should be noted that the present embodiments are provided to make a full disclosure and also to allow those skilled in the art to understand the full range of the embodiments. Therefore, embodiments are to be defined only by the scope of the appended claims.

Hereinafter, the operating principles of the present invention will be described in detail below with reference to the accompanying drawings. In the following description, well-known functions or constitutions will not be described in detail if they would obscure the invention in unnecessary detail. Further, the terminologies to be described below are defined in consideration of functions in the invention and may vary depending on a user's or operator's intention or practice.

The embodiment of the present invention applies to an environment in which a robot application composed of multiple robot components and a robot including such a robot application are provided. The embodiment sense and recover a breakdown of any robot components and therefore the object of the embodiment as mentioned above can be easily achieved from the technical concept.

A robot component refers to a robot software module that may be recycled and replaced and may have a standard structure allowing for easily maintaining and repairing a robot application.

In order for one robot component to communicate with another robot component, these robot components are required to be connected via a network. In this case, the connection between the first robot component and the second robot component may mean that each robot component has address information of a counterpart robot component.

Hereinafter, an embodiment of the present invention will be described in detail with reference to the accompanying drawings.

Figure 1:
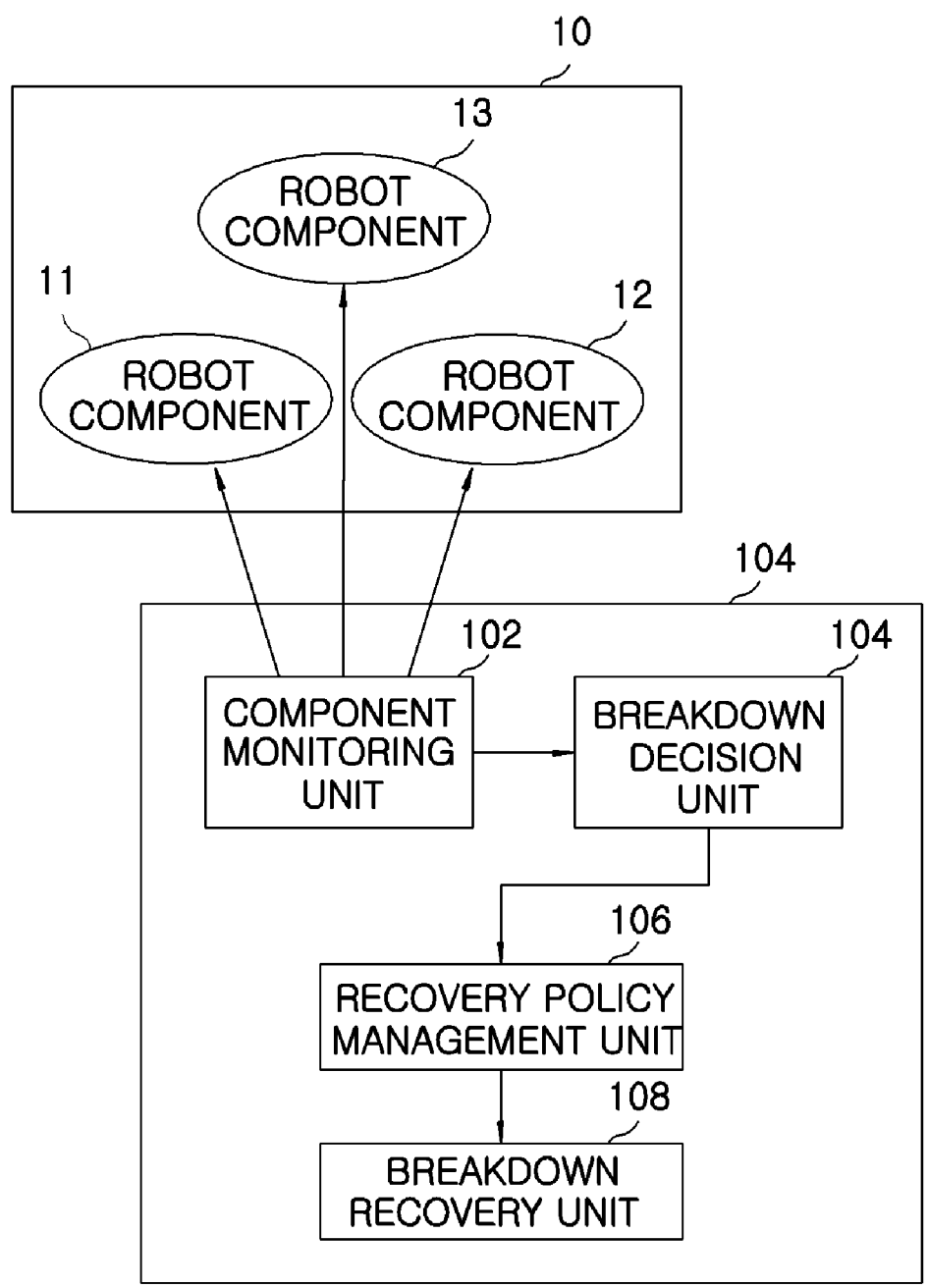
FIG. 1 illustrates a block diagram of an apparatus for managing robot components in a robot in accordance with an embodiment of the present invention.

FIG. 1 illustrates a block diagram of an apparatus for managing robot components in a robot in accordance with an embodiment of the present invention.

A robot includes a robot application 10 and an apparatus 100 for managing the robot components. The robot application 10 includes a plurality of robot components 11, 12, and 13, each component has an identifier. The apparatus 100 includes a component monitoring unit 102, a breakdown decision unit 104, a recovery policy management unit 106, and a breakdown recovery unit 108.

The component monitoring unit 102 monitors a state of the robot components 11, 12, and 13 of the robot application 10, and provides monitoring results to the breakdown decision unit 104.

Based on the monitoring results of the robot components 11, 12, and 13 provided from the component monitoring unit 102, the breakdown decision unit 104 judges whether or not any robot components 11, 12, and 13 are broken down, and generates breakdown information corresponding to a breakdown decision results. For example, when the breakdown decision unit 104 judges that any one of the robot components 11, 12, and 13 is broken down, the breakdown decision unit 104 generates information associated with a breakdown including a type of the breakdown, importance of the breakdown, an identifier of the robot component which has caused the breakdown, and the like.

The recovery policy management unit 106 serves to choose a recovery policy model necessary to recover the breakdown using the breakdown information provided from the breakdown decision unit 104. The recovery policy management unit 160 may include multiple recovery policy nodes configured to have a tree structure as illustrated in FIG. 2.

Figure 2:
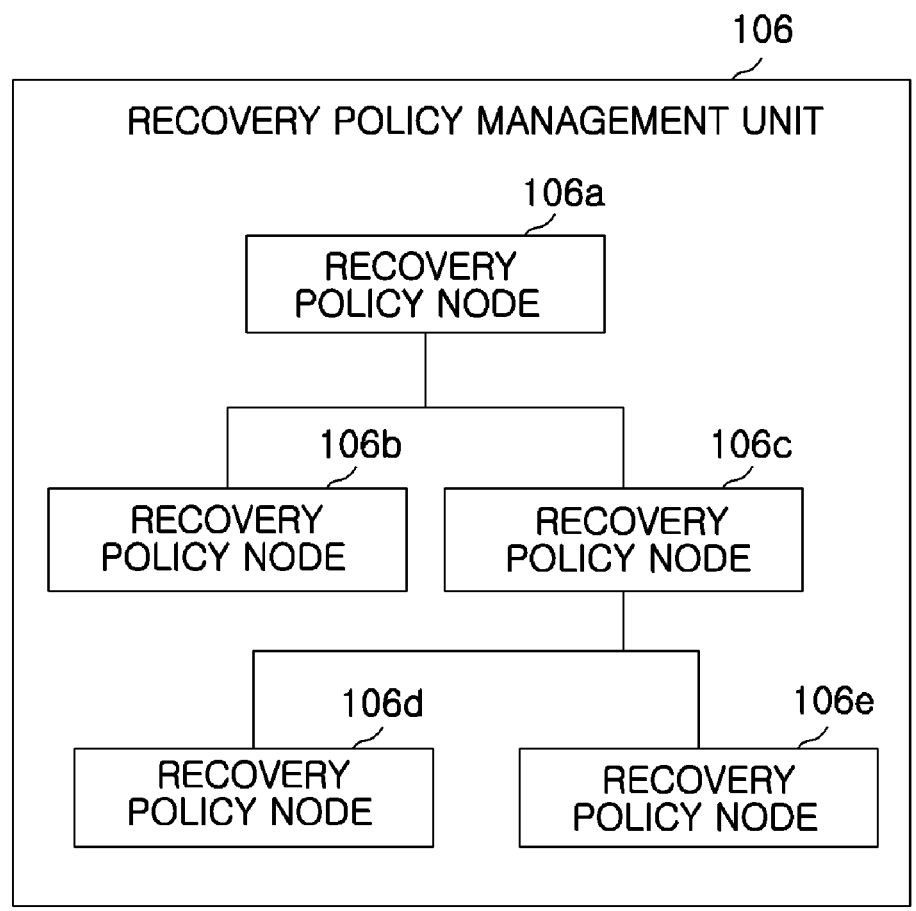
FIG. 2 illustrates a detailed block diagram of the recovery policy management unit shown in FIG. 1.

As illustrated in FIG. 2, the recovery policy management unit 106 includes multiple recovery policy nodes 106a to 106e with a tree structure.

The recovery policy nodes 106a to 106e may be divided into one parent recovery policy node and multiple child recovery policy nodes. Among the recovery policy nodes 106a to 106e, a recovery policy node 106a that does not have a parent recovery policy node will be referred to as the uppermost recovery policy node and the recovery policy nodes 106b, 106d, and 106e that do not have any child recovery policy node will be referred to as terminal recovery policy nodes.

Each of the recovery policy nodes has one or more recovery policy models.

FIG. 4 is an exemplary view of a recovery policy model in accordance with the embodiment.

As illustrated in FIG. 4, a recovery policy model may include a type of a breakdown, a cause of a breakdown, an action to be taken to recover a breakdown, and the like. The respective items in the recovery policy model exemplarily may include the following functions:

Breakdown type: data transmission error

Breakdown cause: network disconnection

Breakdown recovery action: execution of data retransmission after a network connection is re-attempted and interruption of component.

In the recovery policy model, a type of a breakdown specifies an error generated during a data transmission; a cause of a breakdown specifies a disconnection of a communication network; and an action taken for recovering a breakdown specifies re-attempting a network connection and retransmitting data after the network connection is made, and stopping execution of a robot component which has caused a breakdown if a network is not connected even when the network connection is re-attempted.

Meanwhile, the breakdown recovery unit 108 serves to recover the breakdown based on the recovery policy model selected through the recovery policy management unit 106.

Hereinafter, a method for managing robot components in accordance with an embodiment of the present invention will be described in detail with reference to the flow chart of FIG. 3.

Figure 3:
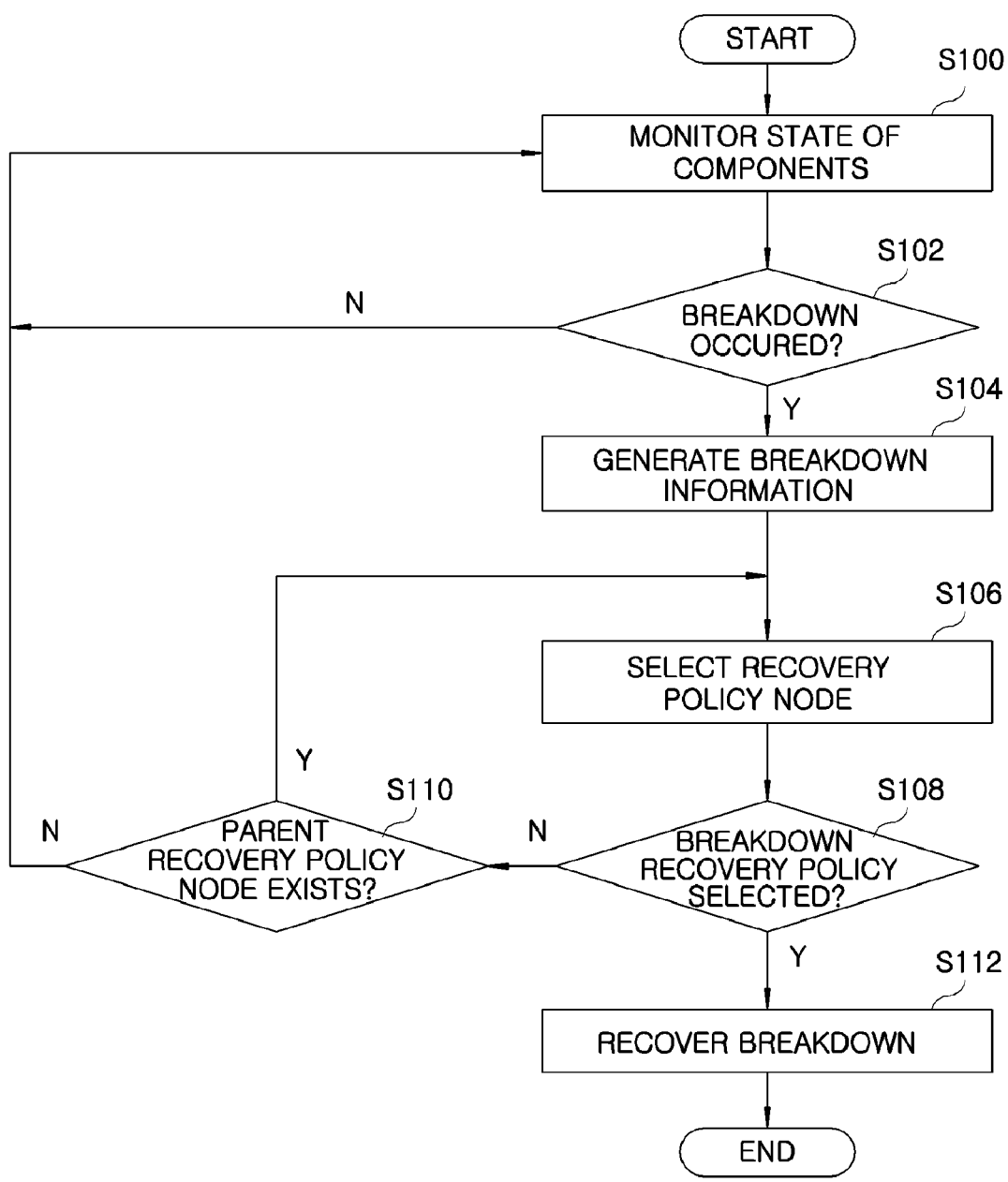
FIG. 3 is a flow chart illustrating a method for managing robot components in accordance with an embodiment of the present invention.

As illustrated in FIG. 3, the component monitoring unit 102 monitors a state of the robot components 11, 12, and 13 in operation S100, and delivers the monitoring results to the breakdown decision unit 104.

The breakdown decision unit 104 analyzes the monitoring results of the robot components 11, 12, and 13 provided form the component monitoring unit 102 to judge whether or not any robot components 11, 12, and 13 are broken down in operation S102. When the breakdown decision unit 104 judges that any robot components 11, 12, and 13 are broken down, it generates breakdown information and provides the same to the recovery policy management unit 106 in operation S104.

The breakdown information includes, for example, a type of a breakdown, the importance of a breakdown, an identifier of a component which has caused a breakdown, and the like.

When the breakdown information is provided to the recovery policy management unit 106, the recovery policy management unit 106 selects a recovery policy node, e.g., the recovery policy node 106a, having a recovery policy model corresponding to a type of the breakdown in the breakdown information among the recovery policy nodes 106a to 106e in operation S106.

The recovery policy node 106a selected by the recovery policy management unit 106 chooses a recovery policy model using the breakdown information in operation S108. The recovery policy model chosen by the recovery policy node 106a is returned to the recovery policy management unit 106. Upon receiving the returned recovery policy model, the recovery policy management unit 106 then delivers the recovery policy model to the breakdown recovery unit 108.

When any recovery policy model cannot be chosen, the recovery policy management unit 106 determines whether or not there exists a parent breakdown recovery policy of the selected recovery policy node 106a in operation S110. If it is determined that a parent recovery policy node of the selected recovery policy node 106a exists, the method returns to operation S106 in which the parent recovery policy node is chosen as the recovery policy node, and the following operations are subsequently performed.

On the other hand, if it is determined that a parent recovery policy node of the selected recovery policy node 106a does not exist, the recovery policy management unit 106 returns to operation S100 to perform the monitoring of a state of the robot components 11, 12, and 13 again. At this time, error information may be returned through the recovery policy management unit 106.

Meanwhile, when a recovery policy model is chosen by the recovery policy node 106a in operation S108, the chosen recovery policy model is then delivered to the breakdown recovery unit 108, so that the breakdown recovery unit 108 can recover the breakdown of the component using the recovery policy model in operation S112.

As described above, in accordance with the embodiment of the present invention, a state of the robot components constituting the robot application is monitored, whether or not a robot component is broken down is determined, and a recovery procedure is performed thereon when a robot component is broken down, thereby minimizing malfunction of a robot and continuously providing a service.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for managing robot components in a robot, the apparatus comprising:
   a component monitoring unit configured to monitor a state of the robot components;
   a breakdown decision unit configured to judge whether or not any robot components are broken down based on the monitoring results, and generate breakdown information corresponding to the breakdown decision results, wherein the breakdown information comprises at least one of a type of the breakdown, importance of the breakdown, and an identifier of a component which has caused the breakdown;
   a recovery policy management unit configured to choose a recovery policy model necessary to recover the breakdown from among a plurality of available recovery policy models using the breakdown information; and
   a breakdown recovery unit configured to recover the broken robot component based on the chosen recovery policy model;
   wherein the recovery policy model management unit further is configured to:
   select a recovery policy node corresponding to the type of breakdown;
   select the recovery policy model contained in the selected breakdown recovery policy node using the breakdown information;
   determine whether or not a parent recovery policy node exists among a plurality of recovery policy nodes when the recovery policy model is not selected; and
   select the parent recovery policy node as the recovery policy node when the parent recovery policy node exists.

2. The apparatus of claim 1, wherein the recovery policy management unit comprises multiple recovery policy nodes configured to have a tree structure, each recovery policy node has one or more recovery models corresponding to the breakdown information.

3. The apparatus of claim 2, wherein the recovery policy nodes comprise a parent recovery policy node and multiple child recovery policy nodes.

4. The apparatus of claim 3, wherein the recovery policy nodes comprise:
   an uppermost recovery policy node that does not have a single parent recovery policy node; and
   terminal recovery policy nodes that do not have the multiple child recovery policy nodes.

5. A method for managing robot components in a robot, the method comprising:
   monitoring a state of the robot components;
   analyzing the monitoring results of the robot components to judge whether or not the robot components are broken down;
   generating breakdown information when it is determined that any robot components are broken down, wherein the breakdown information comprises at least one of a type of the breakdown, importance of the breakdown, and an identifier of a component which has caused the breakdown;
   selecting a recovery policy model corresponding to the breakdown information from among a plurality of available recovery policy models; and
   recovering the broken robot component based on the recovery policy model,
   wherein said step of selecting a recovery policy model comprises
   selecting a recovery policy node corresponding to the type of breakdown;
   selecting the recovery policy model contained in the selected breakdown recovery policy node using the breakdown information;
   determining whether or not a parent recovery policy node exists among a plurality of recovery policy nodes when the recovery policy model is not selected; and
   selecting the parent recovery policy node as the recovery policy node when the parent recovery policy node exists.

6. The method of claim 5, wherein said selecting a recovery policy model comprises:
   returning the selected recovery policy model; and
   delivering the returned recovery policy model to recover the breakdown.

7. The method of claim 5, further comprising:
   returning to monitor a state of the robot components when the parent recovery policy node does not exist.

8. The method of claim 5, wherein the recovery policy model comprises a type of the breakdown, a cause of the breakdown, and an action to be taken to recover the breakdown.

* * * * *